Patented May 25, 1943

2,320,063

UNITED STATES PATENT OFFICE 2,320,063

PREPARATION AND USE OF CATALYSTS

Casimer J. Borkowski, Chicago, and Jacob L. Schille, Berwyn, Ill., assignors to The Best Foods, Inc., New York, N. Y., a corporation of Delaware No Drawing. Application June 26, 1940, Serial No. 342,446

21 Claims. (Cl. 252—198)

This invention relates to the production and use of catalysts and more particularly to the production of a metallic catalyst, for example, a nickel-copper catalyst, and its use in the hydrogenation of vegetable oils or other glycerides.

In the preparation of vegetable oils, such, for example, as cottonseed oil for use as a margarine oil, it is desirable and necessary to carefully control the progress of the hydrogenation of the unsaturated oil so as to obtain a product having the desired physical characteristics. It has previously been proposed to use prepared nickel and copper catalysts in the hydrogenation of such oils. However, the procedures used in the preparation and use of such catalysts have presented certain difficulties and disadvantages and the amounts of such catalysts necessary for use in the hydrogenation have in some instances been such as to cause off-odors and flavors and other undesirable effects in the oil. Also the loss of active catalyst through difficulties in separating it from the oil and the necessity of alkali refining the hydrogenated oil to remove catalyst retained in it have presented difficult problems in such operations.

It is an object of the present invention to provide an improved procedure for the preparation of such catalysts. It is also an object to provide an improved catalyst and one that may be used in smaller amounts in the hydrogenation of glyceridic oils. Another object is to provide a catalyst that may be more readily removed from the oil after the hydrogenation. A further object is to provide an improved procedure for the use of such metallic catalysts in the hydrogenation of glyceridic oils. Other objects will become apparent.

As an example of a procedure utilizing the invention, controlled proportions of water soluble salts of nickel and copper are put into an aqueous solution in the proper proportions to give the desired catalyst and the metals are precipitated in the cold (for example, at room temperatures) upon a carrier, preferably inert, such as kieselguhr (diatomaceous earth), by addition of a carbonate or bicarbonate, such for example as an alkali carbonate or bicarbonate or other suitable soluble carbonate or bicarbonate that will precipitate the metals, the carbonate being present preferably in stoichiometric proportions in relation to the metals to be precipitated. An amount of inert carrier such as to give a ratio of about 1 to 5 parts of carrier to 1 part of nickel (calculated as metallic nickel) is preferred. It is desirable to keep the amount of water in the solution as low as practicable so as to have the solution as saturated as practicable with carbon dioxide liberated by the reaction, in order to produce a more highly active catalyst. A more dilute solution may be used but with an attendant loss in activity of the catalyst, apparently due to a reduction of the amount of bicarbonate in the mixture.

The material is then filtered and washed in a filter press preferably at a temperature of about 40 to 90° F., for one to two hours, and the washed product is dried at temperatures below 200° F., and preferably at about 80 to 110° F., by passing a current of air or other gas at atmospheric pressure and at the proper temperature over the washed precipitate spread out on trays or pans. If desired, pressures below atmospheric may be used with or without the passage of air or other gas over the precipitate or the pressures may be above atmospheric with the passage of such a gas over the precipitate. The resulting product is a complex mixture of compounds of copper and nickel, apparently including the hydrate, carbonate and bicarbonate. In this drying step it is desirable to avoid excessive temperatures, since such temperatures cause a densification of the product, apparently by a change in chemical composition by which carbon dioxide is removed, with an attendant reduction in the percentage of bicarbonate present. Also, a thorough and complete washing is not necessary and it is desirable to avoid excessive washing of the product, since some of the nickel and copper compounds are dissolved out by such washing.

After drying, the precipitate is ground and mixed with an inert liquid vehicle of high boiling point and high flash point, preferably with a small and controlled amount of a fatty material or glyceridic oil, and heated, with agitation, to about 300 to 360° F. in a closed kettle and in an atmosphere of nitrogen or other inert gas that is non-poisonous to the catalyst. This procedure is followed to remove the free and loosely combined water and to avoid premature reduction of the copper so as to assure simultaneous reduction of the copper and nickel. The agitation during the heating may be by stirring and may be supplemented by bubbling the inert gas through the mixture.

The inert liquid vehicle referred to above may be a refined mineral oil, such as a paraffin type oil free from deleterious substances, for example, a white mineral oil U. S. P. The fatty material or glyceridic oil may be a fatty oil or fatty acid, such as a refined vegetable oil or the fatty acids thereof, and preferably is the same or of the same oil or, a similar oil, as that in which the product is to be used as a catalyst. The oily mixture should be one that is liquid at and below the temperature of the reduction and is, preferably, one that is liquid at room temperatures. It is desirable to get as much of the precipitate as possible into the oil without getting a mixture that is too thick to work with conveniently. The optimum proportion of the mineral oil is not less than about 7 parts by weight thereof to one part of nickel (as metallic nickel in which amounts the material is quite doughy) and is preferably about 14 parts of said oil to one part of nickel. More mineral oil can be used, but there is no particular advantage in doing so. The optimum amounts of the fatty oil are about ½ to 1 part of the fatty oil to 1 part of nickel, the proportions of which may be adjusted, as hereafter indicated, depending upon the results desired.

When the temperature has been elevated to the temperature indicated above, a rapid stream of hydrogen is passed, preferably continuously, through the mixture maintained at a temperature of about 340 to 380° F. (about 170 to 200° C.) for about 2 to 6 hours. A pressure in the kettle of slightly above atmospheric is preferred although higher or lower pressures may be used. The rate of flow of the hydrogen should be such that there is a considerable excess of hydrogen over that required for the reduction, it being desirable to reduce the metals as quickly as possible. The time of heating is preferably not over three hours, although the time required will depend upon the equipment used. It should be continued until no more moisture and/or carbon dioxide comes off and until little or no moisture and/or carbon dioxide remain in the mixture. There is no advantage in continuing the flow of hydrogen thereafter and it may result in diminishing the effectiveness of the catalyst.

After the reduction of the catalyst is completed, the reduced catalyst is cooled to below 200° F. and may be used immediately in the next step or, if desired, it may be cooled to room temperature. It is not pyrophoric nor readily changed by exposure to air. If desired, the mineral oil can be removed from the reduced catalyst by filtration through a filter press or by other means. The reduced catalyst may be kept for extended periods in sealed drums.

The resulting catalyst is brownish black in color and is in a very finely divided (colloidal) state and preferably contains copper and nickel in the proportions of about 1 to 2 parts of copper to 5 parts of nickel. Small percentages of other metals, such as cobalt or iron, or other impurities may also be present. The catalyst may be used directly, and preferably after mixing with an activated carbon or other substance of high sorbent (adsorbent or absorbent) value, in the hydrogenation of unsaturated glyceridic oils, such as vegetable, animal or fish oils, at temperatures of 300 to 400° F. and hydrogen pressures of 2 to 20 pounds per square inch, to prepare products as described in the Vahlteich et al. Patents Nos. 2,047,530 and 2,167,113. The oil treated should be an oil containing little free fatty acids, i. e., preferably not over .05% of free fatty acids. It is desirable, therefore, to use an alkali refined oil.

The hydrogenation should be carried out with rapid agitation and the temperature is preferably maintained at about 350 to 380° F. Since the reaction is exothermic, cooling may be required to maintain this temperature after the reaction starts.

The hydrogenation is controlled to give a product of the desired characteristics and because of the greater selectivity and activity of the catalyst, a smaller quantity of the catalyst may be used and the hydrogenation may be conducted in less time and with less destructive effect upon the oil being hydrogenated, thus resulting in less production of free fatty acids in the hydrogenated products. Lower pressures may be used than those customary in the hydrogenation of vegetable oils under the same or similar conditions.

In the preparation of margarine oil as described in the above mentioned patents, the catalyst described above may be used in the proportions of about .005 to .05% of the catalyst, based upon the nickel in the catalyst, in relation to the total amount of oil to be hydrogenated. For example, an amount of catalyst containing 0.5 to 5 pounds of nickel may be used with 10,000 pounds of oil. A greater amount of catalyst may be used, but such additional amount gives no added advantage and, in fact, appears to give inferior results. It is preferred to use about .005 to .03% of the catalyst, based upon the nickel present in the catalyst, in relation to the amount of oil to be hydrogenated.

The sorbent material added to the catalyst helps to remove the finely divided nickel and copper in the oil and also helps to remove color and other impurities in the oil. Satisfactory results may be obtained using vegetable carbon in the proportions of about 10 to 20 times the weight of the nickel in the catalyst used. With other sorbent substances, such as "acid" earths or bleaching earths, for example, fuller's earth, having less sorptive value, higher concentrations may be required. It is desirable to use carbon in particles as finely divided as practicable, since such carbon is more active and smaller quantities may be used, thus entailing less loss of oil by retention in the separated carbon.

The heat may be supplied during the preparation and reduction of the catalyst by means of steam under pressure in closed coils and/or by electrical means, such as an electric immersion heater or by other suitable means, it being desirable, of course, to avoid an open flame in the presence of hydrogen.

As a specific example of the procedure, about 58 pounds of nickel sulfate and 12 pounds of copper sulfate are dissolved in 300 pounds of cold water. To this is added 38 pounds of sodium carbonate dissolved in 150 pounds of water in a tank equipped with an agitator. After mixing for 30 minutes, 24 pounds of diatomaceous earth is added and the agitation continued for 15 minutes. The resulting precipitate is filtered and washed with cold water (40 to 90° F.) for one and one-half hours using a flow of water of about 5 gallons per minute. The precipitate is then dried at 100° F. with forced air circulation for approximately 48 hours. The yield is about 58 pounds of the precipitate and carrier. The dried precipitate and carrier is ground to a fineness of approximately 100 mesh. To 100 pounds of white mineral oil and 5 pounds of cottonseed oil, 28 pounds of the ground precipitate and carrier is added. The mixture is agitated and heated to about 340° F. while a stream of nitrogen is continually passing through it. When the temperature reaches about 340° F., the flow of nitrogen is stopped and a rapid stream of hydrogen passed through for about one hour. Then the temperature is raised to 380° F. and the reduction continued for two hours.

The resulting product is mixed with activated carbon in the proportions of about 10 to 20 times the amount of nickel used and the mixture is added to the oil to be hydrogenated. For example, 7000 pounds of cottonseed oil may be hydrogenated to an iodine number of 68.0 in 45 minutes at 10 pounds hydrogen pressure and at a temperature of 380° F., using a catalyst prepared as described above and containing .6 pound of nickel and .15 pound of copper (on a metal basis), and 14 pounds of activated carbon. The hydrogenated oil may be cooled to 150 to 200° F. and filtered in the usual manner, the filtered oil being clear, bright and free of metals and having a low fatty acid content (less than 0.05%).

By following the procedure described above, a margarine oil of the type described in Patents Nos. 2,047,530 and 2,167,113 may be produced and the catalyst resulting from the specific example given is particularly suited for the preparation of such a margarine oil. It is not intended, however, to limit the invention to the procedure of that example, which obviously may require alteration to meet particular requirements.

For example, the fineness of division of the particles of catalyst to be used may be controlled to give the optimum characteristics under the particular conditions of use. Increased fineness is advantageous in that the catalyst provides more surface area and is more active. However, increasing the fineness increases the difficulty of separation of the catalyst by filtration from the vegetable oil after being used as a catalyst in the hydrogenation and increases the likelihood of clogging the pores of the filter in such filtration. Thus a balance must be struck between these two opposed effects. For instance, a catalyst reduced in refined mineral oil without the addition of fatty oil will produce, upon reduction, a less finely divided or non-colloidal catalyst. This catalyst can be separated more readily by filtration after the hydrogenation, and may avoid the necessity of adding carbon to produce a metal free oil after use of the catalyst in the hydrogenation, but it will have less selectivity and activity. The addition of a refined fatty oil, preferably in the proportions indicated above, will produce, upon reduction of the metal as described above, a highly selective and active catalyst that can be readily separated by the addition of sorbent carbon or other sorbent material.

The nickel and copper may be precipitated upon the carrier in the form of other salts or compounds capable of being precipitated on the carrier and that may be reduced with hydrogen. It is preferred to use salts or compounds that will be deposited in a finely subdivided form.

As indicated above, the nickel and copper salts are heated to the temperature of the reduction reaction in the presence of an inert gas (or other non-oxidizing and non-reducing atmosphere) to avoid reduction of the copper in advance of the nickel which would result in the production of a reddish product, it being desired to reduce them simultaneously when the pure hydrogen is introduced. In following the procedure as described, the mixture (which is green at first), upon introduction of the hydrogen, first changes to a light brown, then to a chocolate color and finally to the fully reduced product, which is brownish black.

By controlling the relative amount of copper to nickel in the catalyst used in the hydrogenation, the character and extent of the hydrogenation may be governed. The copper is not as active a catalyst as the nickel, although a small amount of the copper has a marked accelerating effect upon the effectiveness of the catalyst. Also it makes it possible to reduce the nickel catalyst at a lower temperature.

The addition of the carbon or other sorbent material to the oil being hydrogenated is an important feature, since it makes it possible to use a more finely divided and so more active catalyst. The finely divided nickel and copper are apparently adsorbed by the carbon and are removed with it in the filtering operation. This removal of the nickel and copper is very important because they have a deleterious effect upon the keeping qualities of the product as well as its flavor and odor. Thus, the addition of the carbon avoids the necessity of a subsequent alkali refining to remove these substances.

The carbon also has a bleaching and other refining action upon the oil and although it can be added after the hydrogenation, it is preferred to add it before the hydrogenation. For example, the catalyst and carbon may be mixed with the same or separate quantities of the oil to be hydrogenated and pumped into that oil which has been heated to about the reacting temperature.

The addition of carbon or other sorbent material to the catalyst during or before the hydrogenation may be utilized in other procedures for the preparation of catalysts. For example, it may be used with a catalyst produced by the dry process in which the nickel (or a mixture of nickel and copper) is precipitated from a solution of a soluble nickel salt, such as nickel sulfate, (or a mixture of nickel and copper salts) by an alkali, such as caustic soda (preferably in the presence of an inert carrier) and the precipitate is dried, finely ground and passed dry through a tubular furnace in an atmosphere of hydrogen and at a temperature sufficiently high to reduce the nickel oxides, hydroxides and carbonates of the precipitate to active black metallic nickel. Upon completion of this reduction step the reduced powder is dropped into a suitable oil to avoid spontaneous combustion and the catalyst is used as an oleageneous black paste or liquid. When the catalyst produced by this procedure is sufficiently finely divided to require it or where it is desirable for other reasons to use the carbon or other sorbtive material, the carbon or other sorbtive material may be mixed with the catalyst in the paste or liquid or may be added to the oil to be hydrogenated, preferably before the hydrogenation.

This feature of adding the carbon or other sorbtive material may also be utilized to advantage in the preparation of the oleagenous black paste of the catalyst by a procedure that avoids the necessity for precipitating soluble nickel salts with caustic and subsequently drying them preparatory to reduction in the furnace. Such a process comprises heating an organic salt of nickel, such as nickel formate (or mixture of suitable nickel and copper organic salts), in a suitable oil vehicle and at a temperature sufficiently high to reduce the nickel. This procedure results in a finely divided nickel that is likely to pass through the filtering medium into the filtered oil, thus resulting in loss of the most active catalytic material and requiring alkali refining of the hydrogenated oil. The addition of the activated carbon or other highly active sorbtive material, preferably before the hydrogenation, effectively retains the extremely finely divided metallic nickel catalyst, thus permitting a brilliant clear oil to be obtained by the usual filtration methods.

As an example of such a procedure, about 100 grams of powdered commercial nickel formate may be added to a blend of 238 grams of white mineral oil and 16 grams of refined cottonseed oil. If desired a carrier, such as diatomaceous earth, may be added as described in the previous example. The mixture may then be agitated and heated to about 400–450° F. while a stream of nitrogen is continuously passed through it. This temperature of 400–450° F. is maintained for about 15 minutes, or until the first stage of the reduction reaction is completed. With a continuous flow of nitrogen still passing through the reaction mixture, the temperature may then be increased to about 500–550° F. and this temperature maintained for about 15 minutes, or until the reduction is completed. The resulting product may then be cooled to about 200–250° F. and mixed with an activated carbon sorbent in the proportions of 15 times the amount of metallic nickel present. The mixture may then be added to the oil to be hydrogenated. The hydrogenation can then be carried out in the usual manner. With this procedure, using nickel alone, it is preferred to use a catalyst in the proportion of .02 to .05% of metallic nickel based on the amount of oil to be hydrogenated.

It is not necessary, for all hydrogenation purposes, to prepare the above described catalyst with the exact amounts of nickel formate, neutral white mineral oil and refined cottonseed oil indicated in the example. These amounts may be considerably varied in order to meet specific hydrogenation requirements. It is to be noted also, that while the use of nitrogen alone is indicated in this example of a so-called "wet" reduction, hydrogen may also be used in addition to nitrogen; or hydrogen may be used to the exclusion of nitrogen. We prefer to use nitrogen because it is safer and because the hydrogen or other reducing gas produced in the reaction is sufficient without the addition of further hydrogen.

The use of sorbent carbon as described herein not only prevents the loss of finely divided nickel through the usual filtering media and avoids the necessity for re-refining the hydrogenated oil, but also results in a production of a hydrogenated oil which is distinctly more satisfactory for certain uses, such as a margarine oil, in that a better relation of melting point to setting point is obtained and in that the hydrogenation proceeds much more rapidly.

With a suitable organic copper salt this procedure may be used to produce a catalyst that comprises a mixture of copper and nickel.

Many other variations may be made in the above procedure and it is not intended to restrict it to the particular proportions, temperatures, times, etc., given as illustrative. For example, instead of the diatomaceous earth used as the carrier for the catalyst, other carriers may be used, such, for example, as fuller's earth or finely divided carbon.

The carbon, fuller's earth, etc., added to assist in the separation of metals, and the diatomaceous earth or other substance used as a carrier, should be free from impurities, such as sulfur, phosphorus, caustic and acid, and from other impurities or deleterious substances that would poison the catalyst. The gases used in preparing the catalyst or in the hydrogenation also should be free from those substances or from other substances that would poison the catalyst, such, for example, as carbon monoxide.

The terms used in describing the invention have been used as terms of description and not as terms of limitation and it is intended to include within the scope of the appended claims all equivalents of the terms used. In using the term fatty material in the claims it is intended to include fatty acids as well as fatty oils. Also, it is appreciated that a substance having a beneficial effect may be included with the inert carrier, vehicle or gas referred to herein and in using the term inert in the claims it is intended to exclude substances which would have a detrimental effect upon the intended reactions but to not preclude the inclusion of substances which may be active but which do not have a detrimental effect. In using the term colloidal in the present specification it is intended to include very finely divided particles of the catalyst that are difficult or impossible to remove by usual filtering operations. Also, the active nickel catalyst resulting from the reduction of the nickel salt (with or without copper) probably is not composed entirely of metallic nickel, and in using the term active metal or active nickel in the appended claims, it is not intended to restrict the claim to a susbtance consisting entirely of the metallic metal.

We claim:

1. A method of preparing a catalyst, comprising precipitating carbonates of nickel and copper, drying the precipitate at temperatures not over about 200° F., heating the precipitate in an inert liquid vehicle and in intimate contact with an inert gas to a temperature of about 300 to about 360° F., and thereafter reducing the mixture with hydrogen while maintaining it at temperatures between about 300° and 400° F.

2. A method of preparing a catalyst, comprising precipitating carbonates of nickel and copper upon a carrier in an aqueous solution saturated with carbon dioxide upon precipitation, separating and drying the carrier and precipitate at temperatures not over about 200° F., heating the carrier and precipitate in an inert liquid vehicle and in intimate contact with an inert gas to a temperature of about 300 to about 360° F., and thereafter reducing the mixture with hydrogen while maintaining it at temperatures between about 300° and 400° F.

3. A method of preparing a catalyst, comprising precipitating carbonates of nickel and copper upon a carrier, separating and drying the carrier and precipitate at temperatures not over about 110° F., heating the carrier and precipitate in an inert liquid vehicle and in intimate contact with an inert gas to about 300° to 360° F. and thereafter reducing the mixture with hydrogen while maintaining it at temperatures of about 340° to 380° F.

4. A method of preparing a catalyst, comprising precipitating carbonates of nickel and copper, separating and drying the precipitate at temperatures not over about 110° F., heating the precipitate in a mixture of white mineral oil and a smaller proportion of fatty material and in intimate contact with an inert gas to above about 300° F. and thereafter reducing the mixture with hydrogen while maintaining it at temperatures between about 300° and 400° F.

5. A method of preparing a catalyst, comprising precipitating carbonates of nickel and copper upon a carrier, separating and drying the carrier and precipitate at temperatures not over about 200° F., heating the carrier and precipitate in a mixture composed principally of a mineral oil vehicle and a smaller proportion of fatty material to above about 300 F. and thereafter exposing the mixture to hydrogen while maintaining it at temperatures between about 300° and 400° F.

6. A method of preparing a catalyst, comprising precipitating carbonates of nickel and copper upon an inert carrier, separating and drying the carrier and precipitate at temperatures not over about 110° F., heating the carrier and precipitate in a mixture composed principally of a mineral oil and a smaller proportion of fatty oil to above about 300° F in an inert atmosphere and thereafter exposing the mixture to hydrogen while maintaining it at temperatures between about 300° and 400° F.

7. A method of preparing a catalyst, comprising precipitating carbonates of nickel and copper upon an inert carrier, separating and drying the carrier and precipitate at temperatures not over about 110° F., heating the carrier and precipitate in a mixture composed principally of a neutral mineral oil and an amount of a fatty oil equal to about ½ to 1 part of a fatty oil to 1 part of nickel in the catalyst to above about 300° F. in an inert atmosphere and thereafter exposing the mixture to hydrogen while maintaining it at temperatures between about 300° and 400° F.

8. A method of preparing a catalyst, comprising precipitating carbonates of nickel and copper upon an inert carrier, separating and drying the carrier and precipitate at temperatures not over about 110° F., heating the carrier and precipitate in a mixture of not less than 7 parts of white mineral oil to 1 part of nickel and ½ to 1 part of fatty material to one part of nickel to above about 300° F. in an inert atmosphere and thereafter exposing the mixture to hydrogen while maintaining it at temperatures between about 300° and 400° F.

9. A method of preparing a catalyst, comprising precipitating carbonates of nickel and copper upon diatomaceous earth in the proportions of about 1 to 5 parts of earth to 1 part of nickel, separating and drying the earth and precipitate at temperatures not over about 110° F., heating the earth and precipitate in an inert liquid vehicle and in intimate contact with an inert gas to a temperature of about 300 to about 360° F., and thereafter reducing the mixture with hydrogen while maintaining it at temperatures between about 300° and 400° F.

10. A method of preparing a catalyst comprising adding water soluble nickel and copper salts, sodium carbonate and diatomaceous earth to cold water, filtering and washing the precipitate with cold water, and drying at a temperature of about 100° F., grinding the dried precipitate, adding it to a mixture of white mineral oil and fatty material, heating the mixture to about 340° F. while passing a stream of inert gas through it, then passing hydrogen through it while maintained at 340° to 380° F.

11. A catalyst prepared in accordance with the method of claim 1.

12. A catalyst prepared in accordance with the method of claim 3.

13. A catalyst prepared in accordance with the method of claim 7.

14. A method of preparing a catalyst, comprising reducing a compound of nickel to active nickel in a mixture composed principally of a mineral oil vehicle and a smaller proportion of a fatty material.

15. A method of preparing a catalyst, comprising reducing an inorganic compound of nickel to active nickel by exposing it to hydrogen while maintained at about 300° to 400° F. in a mixture composed principally of mineral oil and a smaller proportion of a fatty oil.

16. A method of preparing a catalyst, comprising reducing an organic compound of nickel to active nickel by heating it to the decomposition temperature of the organic compound in a mixture composed principally of mineral oil and a smaller proportion of a fatty oil.

17. A method of preparing a catalyst, comprising reducing a compound of nickel to active nickel in a mixture composed principally of an inert mineral oil vehicle and a smaller proportion of fatty oil in the proportions of about ½ to 1 part of fatty oil to one part of nickel.

18. A method of preparing a catalyst, comprising reducing a compound of nickel to active nickel in a mixture of at least 7 parts of a neutral mineral oil to about one part of fatty oil.

19. A method of preparing a catalyst, comprising reducing a compound of nickel to active nickel in a mixture of an inert mineral oil vehicle and a fatty oil in the proportions of about 7 to 14 parts of mineral oil vehicle to one part of nickel and about one-half to one part of fatty oil to one part of nickel.

20. A method of preparing a catalyst which comprises reducing co-precipitated compounds of nickel and copper to form active nickel in a mixture composed principally of a mineral oil vehicle and a smaller proportion of a fatty material.

21. A method of preparing a catalyst which comprises forming an aqueous solution containing about 58 parts by weight of nickel salt for each 12 parts of copper salt, adding to this solution about 38 parts of sodium carbonate to co-precipitate nickel and copper carbonates, separating and drying the precipitate at temperatures not over 200° F., heating the precipitate in a mixture composed principally of a mineral oil vehicle and a smaller proportion of a fatty oil to above about 300° F., and thereafter exposing the mixture to hydrogen while maintaining it at temperatures between about 300° and 400° F.

CASIMER J. BORKOWSKI.
JACOB L. SCHILLE.